United States Patent [19]

Hacker

[11] Patent Number: 4,895,196
[45] Date of Patent: Jan. 23, 1990

[54] APPARATUS FOR REMOVING BRANCHES FROM TREETRUNKS

[75] Inventor: Gerold Hacker, Vienna, Austria

[73] Assignee: Steyr-Daimler-Puch AG, Vienna, Austria

[21] Appl. No.: 358,066

[22] Filed: May 26, 1989

[30] Foreign Application Priority Data

Jul. 6, 1988 [AT] Austria ................................. 1750/88

[51] Int. Cl.$^4$ ............................................... B27L 1/00
[52] U.S. Cl. ..................................... 144/2 Z; 144/343; 144/380
[58] Field of Search ..................... 144/2 Z, 3 D, 34 R, 144/336, 338, 343, 364, 380

[56] References Cited

FOREIGN PATENT DOCUMENTS 2811660 9/1984 Fed. Rep. of Germany .
3712302 10/1987 Fed. Rep. of Germany .
2855430 12/1987 Fed. Rep. of Germany .

Primary Examiner—W. Donald Bray
Attorney, Agent, or Firm—Marmorek, Guttman & Rubenstein

[57] ABSTRACT

An apparatus for removing branches from treetrunks comprises a frame, which is adapted to be suspended from a lifting tackle and is provided with grippers for engaging the treetrunk from below, with a longitudinal feeding device for moving the treetrunk in its longitudinal direction, with branch-removing tools, which are spaced around the treetrunk, and preferably with a crosscutting tool, which is movable transversely to the direction of the longitudinal feed movement. In order to facilitate the longitudinal feed movement and to permit an undisturbed removal of branches at a high rate, the frame and/or the grippers or the tool carriers are provided with spray nozzles for spraying liquid, such as water or soapy water, onto the treetrunks and lines for supplying said liquid to said spray nozzles are connected to the latter.

8 Claims, 1 Drawing Sheet

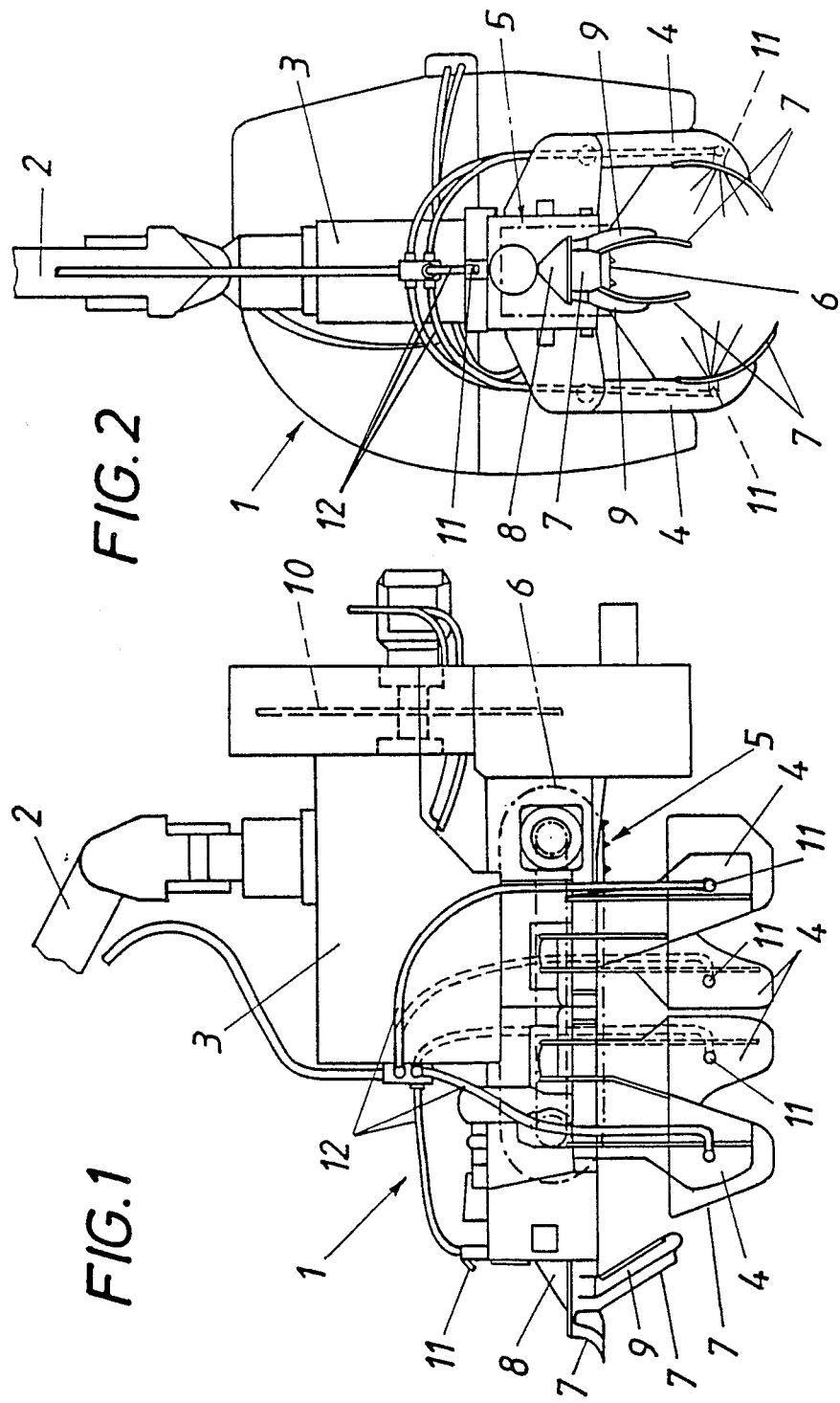

APPARATUS FOR REMOVING BRANCHES FROM TREETRUNKS

BACKGROUND OF THE INVENTION

1. Field of the Invention

This invention relates to an apparatus for removing branches from treetrunks, which apparatus comprises a frame, which is adapted to be suspended from a lifting tackle and is provided with grippers for engaging the treetrunk from below, with a longitudinal feeding device for moving the treetrunk in its longitudinal direction, with branch-removing tools, which are spaced around the treetrunk, and preferably with a crosscutting tool, which is movable transversely to the direction of the longitudinal feed movement.

2. Description of the Prior Art

Such apparatus for removing branches are mounted on a suitable lifting tackle, which in most cases consists of a crane that is mounted on a separate chassis. The apparatuses for removing branches can skilfully be manipulated when they are suspended from the lifting tackle. When it is desired to remove branches from the treetrunks, the apparatus is lowered onto the felled tree with the grippers open. Thereafter the grippers engage the treetrunk from below and hold and guide the treetrunk for the continued processing. When the apparatus which has been coupled to the treetrunk has been lifted the feeding device moves the treetrunk in its longitudinal direction past the branch-removing knives, which face in the opposite direction and which may be secured to separate knife carriers or directly to the gripper arms. Branches are removed from the treetrunk all around its periphery as the treetrunk is pulled through the apparatus. When all branches have been removed from the treetrunk it may be cut to a desired length by a suitable crosscutting device so that felled trees can be stored in an efficient manner.

The pulling of the treetrunk through the branch-removing tool when the treetrunk is gripped by the grippers requires a considerable feeding power. The feeding means may comprise serrated coupling rollers or coupling chains (German Patent Specifications 28 11 660 and 28 55 430, Published German Application 37 12 302), which are caused to engage or embrace the treetrunk and to impart the required longitudinal feed movement to said treetrunk. But in spite of the serrations on said coupling means or of other means provided on said coupling means to improve the coupling between said coupling means and the treetrunk, relatively bulky branches or a relatively thick bark may often give rise to disturbances, such as a jamming of the treetrunks in the coupling means or a slipping of the treetrunks past the coupling means, so that a manual intervention will then be required, which will be difficult and time-consuming and will involve an accident risk.

SUMMARY OF THE INVENTION

It is an object of the invention to eliminate the disadvantage outlined hereinbefore and to provide an apparatus which is of the kind described first hereinbefore and which with a small additional expenditure substantially improves the longitudinal feeding of the treetrunks and ensures a satisfactory and more effective branch-removing operation.

This object is accomplished in accordance with the invention in that the frame and/or the grippers or the tool carriers are provided with spray nozzles for spraying liquid, such as water or soapy water, onto the treetrunks and lines for supplying said liquid to said spray nozzles are connected to the latter.

The treetrunks which have been sprayed with said liquid are slippery so that the frictional forces exerted between the treetrunk, on the one hand, and the grippers and the tools, on the other hand, will be reduced. Said frictional forces may be quite considerable when the surface of the treetrunk is dry. Owing to said reduction of said frictional forces, the operation of the feeding means will not be disturbed and will reliably effect a fast removal of branches at a high rate regardless of the external atmospheric conditions, the time which has elapsed since the trees have been felled, the species of trees, the condition of the bark and other factors. Suitable liquids include particularly water or an aqueous solution of soap but also biodegradable oils or similar substances which are ecologically satisfactory. For the sake of economy, the spray nozzles are operated only when they are required, e.g., during periods of dry weather or during the removal of branches from old trees and where feeding means are used which engage the surface of the treetrunk only on one side so that the load on the grippers is relatively high. The spray nozzles are arranged in such position that they will ensure an effective wetting of the treetrunks with a sufficient amount of liquid particularly in those regions in which the treetrunks are engaged by the grippers and tools whereas the spray nozzles are protected from damage by the treetrunk or by branches. The positioning of the spray nozzles will depend in each case on the design of the apparatus which is employed.

BRIEF DESCRIPTION OF THE DRAWING

FIGS. 1 and 2 are, respectively, a side elevation and a front elevation showing a branch-removing apparatus in accordance with the invention.

DETAILED DESCRIPTION OF THE PREFERRED EMBODIMENT

An illustrative embodiment of the invention will now be described more in detail with reference to the drawing.

An apparatus 1 for an effective removal of branches from treetrunks comprises a frame 3, which is adapted to be suspended from a jib 2 of a lifting tackle, such as a mobile crane, which is not shown in detail. The frame 3 is provided with downwardly protruding grippers 4, which are engageable with a substantially horizontally extending treetrunk on opposite sides in the lower half of its height and are adapted to support said treetrunk, and with feeding means 5, which comprises a revolving endless coupling chain 6 for imparting a longitudinal feed movement to the treetrunk when it is supported by the grippers 4. The frame 3 is provided near its receiving end with branch-removing tools 7. For an adaptation to the diameter of the treetrunk or of the adjacent portion of the treetrunk, said branch-removing tools 7 are mounted on movable knife carriers 8 or on swivel arms 9 or directly on the grippers 4 at locations adjacent to the receiving end of the frame 3. When a treetrunk has been engaged by the grippers 4 and the feeding means 5 have been operated so that the coupling chain 6 pulls the treetrunk in its longitudinal direction through the branch-removing tools 7, the branches will automatically be removed throughout the periphery of the treetrunk. To permit a simultaneous separation of suitable logs, from which the branches have been removed, a suitable crosscutting tool, such as a circular saw, is mounted in the frame 3 adjacent to its delivery end. When the branches have been removed from the treetrunk in a portion having a desired length, the feeding means 5 will be stopped and the crosscutting tool 10 will be operated to cut off the branchless log. This will permit a fast and economical processing of the felled trees.

In order to facilitate the longitudinal feed movement and to reduce the friction which is encountered during the removal of branches, spray nozzles 11 are mounted on the frame 3 and on the grippers 4 near the receiving end of the frame 3 and are adapted to be supplied with water, soapy water or the like through supply lines 12 and will then moisten the surface of the treetrunk which is to be processed. As a result that treetrunk will become slippery even under adverse conditions and can then be pulled through the apparatus 1 by the feeding means 5 without a risk of a disturbance. Because the liquid can be sprayed on the treetrunks in case of need, the branch-removing operation can properly be performed without a risk of a disturbance and at a high rate regardless of the ambient conditions.

I claim:

1. In an apparatus for removing branches from and for crosscutting treetrunks, comprising
   a frame, which is adapted to be suspended from a lifting tackle over a treetrunk having a longitudinal axis extending in a predetermined, substantially horizontal direction,
   gripping means, which protrude downwardly from said frame and are movably mounted on said frame and operable to move into and out of frictional engagement with the lower half of said treetrunk to support the latter,
   branch-removing tools, which are mounted on said frame and distributed around the periphery of said treetrunk when it is thus supported by said gripping means, and
   a longitudinal feeding device, which is mounted on said frame and operable to impart an axial feed movement to said treetrunk when it is thus supported by said gripping means,
   the improvement residing in that
   spray nozzle means for spraying liquid onto said treetrunk when it is thus supported by said gripping means are carried by said frame and
   supply line means for supplying said liquid to said spray nozzle means are connected to said spray nozzle means.

2. The improvement set forth in claim 1, wherein
   a crosscutting tool is mounted on said frame and is operable to move transversely to said predetermined direction and to crosscut said treetrunk when it is thus supported by said gripping means.

3. The improvement set forth in claim 1 wherein said gripping means comprise a plurality of spaced apart grippers, and wherein
   said spray nozzle means are adapted to moisten the periphery of said treetrunk with said liquid before each of said grippers.

4. The improvement set forth in claim 1, wherein said spray nozzle means are directly mounted on said frame.

5. The improvement set forth in claim 1, wherein said spray nozzle means are mounted on said gripping means.

6. The improvement set forth in claim 1, wherein said spray nozzle means comprise at least one spray nozzle directly mounted on said frame and at least one spray nozzle mounted on said gripping means.

7. The improvement set forth in claim 1, wherein
   said spray nozzle means comprise a plurality of spaced apart spray nozzles and
   said supply line means comprise a plurality of supply lines connected to respective ones of said spray nozzles.

8. The improvement set forth in claim 1, wherein said supply line means are adapted to supply a liquid selected from the group consisting of water and soapy water to said spray nozzle means.

* * * * *